7476X
O. H. Brooks,
Washing Machine,
Patented Mar. 11, 1833
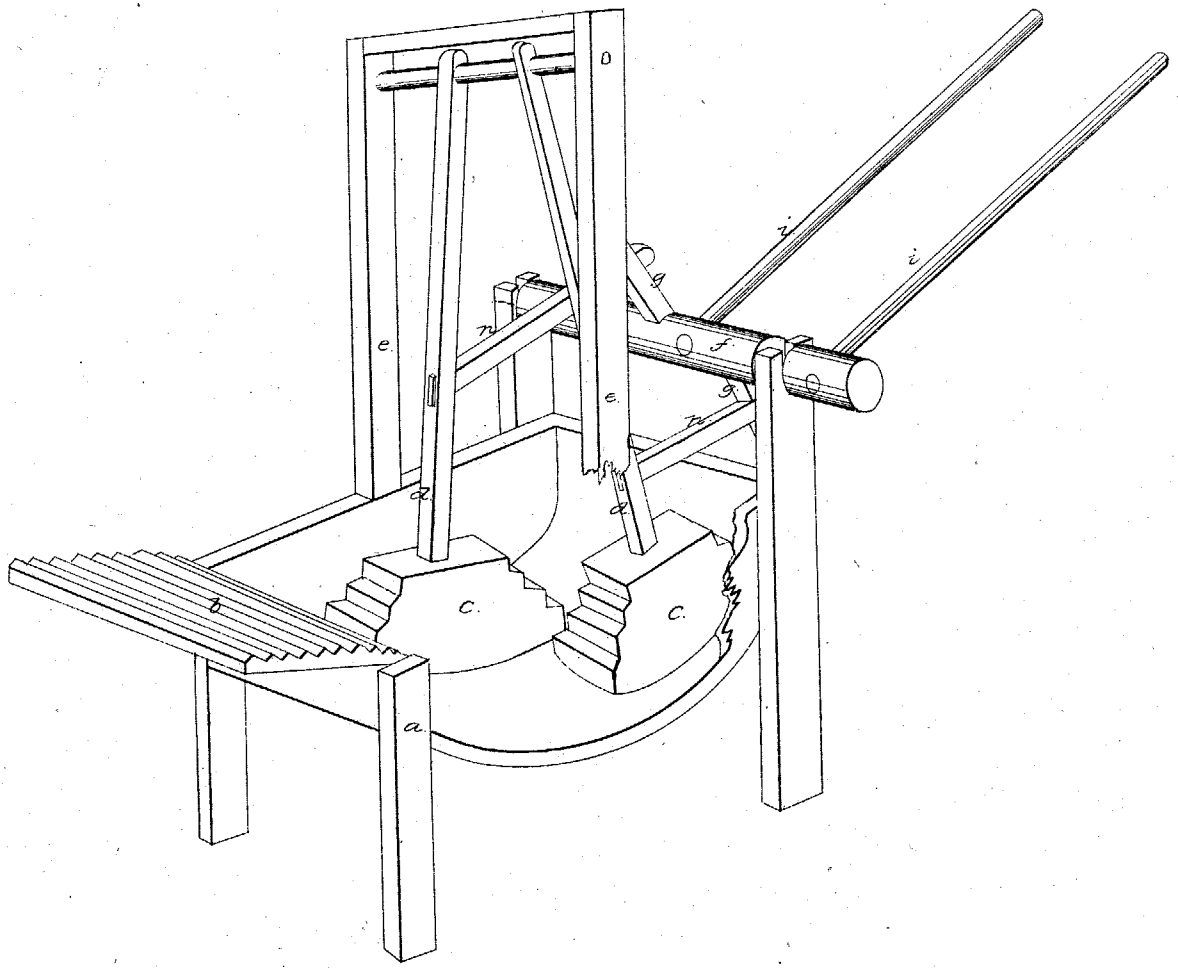
N. PETERS, PHOTO-LITHOGRAPHER, WASHINGTON, D. C.

3/11/1833 7476X

Oliver H. Brooks' Washing Machine &c
Letters Patent

The Schedule referred to in these Letters Patent and making
part of the same containing a description in the words of the said Oliver
H. Brooks himself of his improvement in the Washing Machine & Churn To all to whom these Presents shall come
Be it known that I Oliver H. Brooks of Bethel in the County of Windsor
and State of Vermont have invented a new & useful improvement in a Washing
Machine used for washing clothes and other family articles & a like Machine
used for churning cream into butter. & that the following is a full & exact
description of the construction & operation of the said Machine called the
family washer as invented or improved by me. the parts are. First a movea-
ble chest or box made of boards standing on legs measuring about twenty one
inches long & fourteen & a half inches wide inside near the bottom & about eight
or nine inches high the upper part of one end standing outwards and recessed
[illegible] from a wash board. the bottom hollowed out between the ends up-
on a curve made by a radius of about five feet. Secondly two double head-
ed hammers or blocks of wood about eighteen inches long seven inches wide
& eighteen inches thick notched at both ends much like the hammers
in a common fulling mill. into each hammer is fastened a handle about
five feet long, three inches wide & one & a half inch thick, by which hand-
les the said hammers are hung in said chest about one fourth inch from
the bottom by means of a large pin passing thro' perpendicular posts fasten-
ed upon the centre of the two sides of the chest & thro' the upper ends of the
handles. Thirdly a shaft about twenty inches long & three inches in diameter plac-
ed horizontally across & about seven inches above the end of the chest. that is perpen-
dicular, & is supported on its bearings by two posts attached to the chest, one end of
said shaft coming out about four inches further than the side of the chest. &
into said shaft is firmly fastened two arms about seven inches long & two & a
half inches square one upon the upper side & the other upon the under side.
Fourthly, Two [illegible] about two feet long with a half inch [illegible] & an half inch thick

1416X think: extending from the arms to the hammer handles passing thro' long mortises near the end of the arms & like mortises in the hammer handles horizontal with the shaft, & pins put thro' the arms & reaches about up to a half inch from the centre of the shaft, & pins thro' the hammer handles & reaches horizontal .... with the centre of said shaft in such a manner that the reaches may turn or play in the mortises so far as to let the hammers swing or vibrate from one end of the chest to the other & at such distances that while one hammer hits at one end the other hammer shall hit at the other end being moved either way)

Fifthly) Two round levers about two & a half feet long & one & a fourth inch in diameter, one end of each firmly fastened into each side of the shaft nearly horizontal, the one near the centre & the other near the prominent end.

The Machine being made principally of wood & put together with nails and screws. The manner of putting the Machine in motion is by applying power by hand or otherwise to one or both levers & causing them to vibrate up & down. at the same time it causes the hammers to vibrate in the chest. The manner of using the machine for washing is to put clothes or other articles into each end of the chest & warm water or suds, & by putting the machine in motion it will cause the clothes to be beat, squeezed, rolled over, & washed very fast, & the manner of using the machine for churning cream into butter, is to use a machine of some less dimensions with a cover, by putting the cream into the chest & setting the machine in motion. That part of the above described machine which I claim as the inventor or discoverer are applying the two double-headed hammers, to the use of family washing & churning cream into butter, & the manner of putting them in motion by means of the shaft, arms, reaches & levers, as above described & reference to a drawing heretofore deposited in the Patent Office Oliver M. Brooks

[illegible] Witnesses
[illegible] John H. Kimball
Benj.n Cozzens (555 [illegible])